United States Patent Office 2,981,692
Patented Apr. 25, 1961

2,981,692

DETERGENT COMPOSITIONS

Horatio S. Stillo and Robert S. Kolat, East Lansing, and William R. Nummy, Midland, Mich., assignors to The Dow Chemical Company, Midland, Mich., a corporation of Delaware No Drawing. Filed Feb. 4, 1957, Ser. No. 637,894

4 Claims. (Cl. 252—170)

This invention relates to detergents containing organic surface-active agents and having a novel anti-redeposition agent. More particularly, it relates to such a detergent containing as anti-redeposition agent a polymeric monovinyl ether of diethylene glycol alone or in combination with sodium carboxymethyl cellulose.

Detergents containing organic surface-active agents are being relied upon to an increasing extent in the cleaning of heavily soiled fabrics. Whether detergents of the ionic or non-ionic types are used, redeposition of dispersed soil has been found to decrease the efficiency of such detergents. To reduce redeposition of soil, various anti-redeposition agents have been added to organic surface-active agents. The anti-redeposition agent of choice until the present time has been sodium carboxymethyl cellulose.

It has now been discovered that a polymeric monovinyl ether of diethylene glycol can be used as the sole anti-redeposition agent or in combination with sodium carboxymethyl cellulose to replace at least 8 percent of the sodium carboxymethyl cellulose conventionally used with synthetic organic detergents to improve their anti-redeposition properties. The weight ratio of anti-redeposition agent to detergent can be varied from about 1:10 to 1:80, preferably between 1:20 and 1:80. The weight fraction of polymeric monovinyl ether of diethylene glycol in admixture with sodium carboxymethyl cellulose is preferably varied from about 8 percent to 80 percent in water that ranges from 0 to 150 p.p.m. hardness and from about 40 percent to 80 percent in water that ranges from about 150 to 300 p.p.m. hardness. By "a polymeric monovinyl ether of diethylene glycol," as used in this invention, is meant the polymer having a free hydroxyl content between 9 and 12.8 percent, preferably between 11 and 12.8 percent, and a viscosity (10 percent solution in water) of between 1.5 and 20 cps., preferably between 2 and 10 cps. Suitable sodium carboxymethyl celluloses are those known in the art as detergent grades, having a viscosity of about 15 to 70 cps. (2 percent solution in water) and a degree of substitution of about 1.

In evaluating comparative results obtained in the practice of this invention, and reported in the following table, the following test procedure was used. Four unsoiled cotton swatches, 5 in. x 5 in. bleached, unsized, Indianhead muslin were washed in a U.S. Testing Company, Inc. Terg-O-Tometer for 10 minutes in one liter of an aqueous detergent solution containing 0.011 percent by weight of a colloidal graphite, 0.04 percent Nacconol NRSF (alkyl benzene sodium sulfonate), 0.1 percent commercial sodium tripolyphosphate, and 0.06 percent of a sodium silicate having a ratio of $Na_2O:SiO_2$ of 1:1.6 and a solids content of 50.7 percent, together with soil redeposition inhibitor as stated in the following table in water having the hardness as indicated, expressed as p.p.m. of calcium carbonate, with a ratio of calcium to magnesium of 2:1. The wash temperature was 120° F. and the rate of agitation was 100 cycles per minute.

After the cotton swatches were washed, they were given a brief hand rinse in water of the indicated hardness, agitated in the Terg-O-Tometer for 5 minutes and finally pressed dry. Carbon soil deposition on the swatches was determined by measuring the reflectance of the swatches with a Photovolt Model 610 Reflect-O-Meter, standardized with an enamelled standard at 76.0 percent of the reflectance of a magnesia block. The reflectance of both sides of each swatch was determined and an average of 8 reflectance readings was taken. The results are reported as percent increase in reflectance, which is defined as:

$$\frac{\text{(Reflectance with additive)} - \text{(Reflectance without additive)}}{\text{(Reflectance without additive)}} \times 100$$

Test results are given in the following table.

TABLE

*Soil anti-redeposition activity of CMC and PV DEG[1]*

| Total conc. of redep. inhibitor percent in: | Percent increase in reflectance at indicated weight fractions | | | | |
|---|---|---|---|---|---|
| | 1.00 CMC | 0.25 PV DEG 0.75 CMC | 0.50 PV DEG 0.50 CMC | 0.75 PV DEG 0.25 CMC | 1.00 PV DEG |
| Deionized water: | | | | | |
| 0.00025 | 5.8 | | | | 16.6 |
| 0.0005 | 12.2 | 25.8 | 22.7 | 22.9 | 18.2 |
| 0.001 | 20.8 | 34.7 | 28.8 | 27.0 | 18.2 |
| 0.002 | 30.4 | 40.1 | 36.3 | 37.1 | 19.3 |
| 150 p.p.m. water: | | | | | |
| 0.00025 | 7.3 | | | | 13.4 |
| 0.0005 | 1.5 | 5.5 | 15.1 | 15.7 | 14.7 |
| 0.001 | 12.0 | 19.0 | 27.1 | 20.9 | 16.4 |
| 0.002 | 21.4 | 34.0 | 36.1 | 27.6 | 14.7 |
| 300 p.p.m. water: | | | | | |
| 0.00025 | 1.1 | | | | 12.2 |
| 0.0005 | 7.6 | 0.9 | 19.8 | 16.7 | 11.5 |
| 0.001 | 16.5 | 11.2 | 21.9 | 20.0 | 12.2 |
| 0.002 | 25.0 | 24.4 | 30.5 | 32.0 | 13.3 |

[1] PV DEG=poly-monovinyl ether of diethylene glycol, visc.=2.78 cps., hydroxyl content=12.5 percent; CMC=sodium carboxymethyl cellulose, medium viscosity (detergent grade).

Similar improvement in anti-redeposition properties is obtainable with other synthetic organic detergents, whether anionic or non-ionic in nature.

What is claimed is:

1. A detergent composition, the detergent component of which consists of a synthetic organic detergent selected from the group consisting of anionic and non-ionic synthetic organic detergents and as an anti-redeposition agent a composition selected from the group consisting of a polymeric monovinyl ether of diethylene glycol having a free hydroxyl content between 9 and 12.8 percent and a viscosity between 1.5 and 20 centipoises (10 percent solution in water) and mixtures of said ether with a detergent grade of sodium carboxymethyl cellulose containing at least 8 weight percent of said ether, the balance being sodium carboxymethyl cellulose, the weight ratio of said anti-redeposition agent to said synthetic organic detergent ranging between about 1:10 and 1:80.

2. The detergent composition of claim 1 wherein the anti-redeposition agent is a polymeric monovinyl ether of diethylene glycol.

3. The detergent composition of claim 1 wherein the anti-redeposition agent is a mixture of from 8 to 80 percent by weight of a polymeric monovinyl ether of diethylene glycol and from 92 to 20 percent of a detergent grade sodium carboxymethyl cellulose.

4. The detergent composition of claim 1 consisting essentially of an aqueous solution the detergent component of which consists of a synthetic organic detergent selected from the group consisting of anionic and non-ionic synthetic organic detergents and the anti-redeposition agent of which consists of a mixture of from 8 to 80 percent by weight of a polymeric monovinyl ether of diethylene glycol having a free hydroxyl content between 9 and 12.8 percent and a viscosity of between 1.5 and 20 centipoises (10 percent solution in water) and from 92 to 20 percent of a detergent grade sodium carboxymethyl cellulose, the weight ratio of said anti-redeposition agent to said synthetic organic detergent ranging between 1:10 and 1:80.

References Cited in the file of this patent
UNITED STATES PATENTS

| | | |
|---|---|---|
| 2,104,002 | Reppe et al. | Dec. 28, 1937 |
| 2,226,075 | Rowe | Dec. 24, 1940 |
| 2,755,252 | Fong et al. | July 17, 1956 |

OTHER REFERENCES

"Surface Active Agents," by Schwartz and Perry (1949), Interscience Pub., Inc., New York, pages 234–235.

"CMC-CT" publication, 1955 ed., Hercules Powder Co., pages 2–3.